(12) United States Patent
Israelsen

(10) Patent No.: US 10,740,898 B2
(45) Date of Patent: Aug. 11, 2020

(54) METHODS AND SYSTEMS FOR HOTSPOT DETECTION

(71) Applicant: Quantum IR Technologies, LLC, South Jordan, UT (US)

(72) Inventor: Mark C. Israelsen, Draper, UT (US)

(73) Assignee: QUANTUM IR TECHNOLOGIES, LLC, South Jordan, UT (US)

( * ) Notice: Subject to any disclaimer, the term of this patent is extended or adjusted under 35 U.S.C. 154(b) by 0 days.

(21) Appl. No.: 15/197,536

(22) Filed: Jun. 29, 2016

(65) Prior Publication Data

US 2017/0094228 A1 Mar. 30, 2017

Related U.S. Application Data

(60) Provisional application No. 62/186,262, filed on Jun. 29, 2015.

(51) Int. Cl.
| | |
|---|---|
| *G06T 7/11* | (2017.01) |
| *H04N 5/33* | (2006.01) |
| *G01J 5/00* | (2006.01) |
| *G01J 5/02* | (2006.01) |

(Continued)

(52) U.S. Cl.
CPC ............... *G06T 7/11* (2017.01); *G01J 5/0037* (2013.01); *G01J 5/0066* (2013.01); *G01J 5/026* (2013.01); *G06T 3/4038* (2013.01); *G06T 7/0004* (2013.01); *H04N 5/33* (2013.01); *G01J 2005/0077* (2013.01); *G06T 2207/10048* (2013.01); *G06T 2207/30108* (2013.01)

(58) Field of Classification Search
CPC .... G06T 7/11; H04N 5/33; G01J 5/505; G01J 2005/0077
See application file for complete search history.

(56) References Cited

U.S. PATENT DOCUMENTS 8,531,562 B2 * 9/2013 Schmidt ............... H04N 5/2254
348/262
8,577,120 B1 * 11/2013 Koshti .................. G06T 7/0004
250/341.8

(Continued)

OTHER PUBLICATIONS

Earls (Stochastic inverse thermographic characterization of sub-pixel sized through cracks—Mechanical Systems and Signal Processing published in 2012 Elsevier Ltd) (Year: 2012).*

*Primary Examiner* — Nasim N Nirjhar
(74) *Attorney, Agent, or Firm* — Maschoff Brennan

(57) ABSTRACT

Methods and systems for monitoring an industrial process are disclosed. Some aspects of the system arrange multiple imaging sensors to image machinery associated with an industrial process. Regions of interest within images acquired by the multiple imaging sensors may be monitored for abnormal thermal conditions, and alerts generated as needed. Alerts may also be generated if temperatures within a region of interest exceed thresholds associated with that region of interest. Each region of interest may be independently monitored and have individualized alerting thresholds. In some aspects, images from the multiple imaging sensors may be stitched together, with the regions of interest based on the stitched image. In other aspects, regions of interest within images from separate imaging sensors may be linked together so as to share at least common alerting thresholds.

20 Claims, 14 Drawing Sheets

(51) Int. Cl.
*G06T 7/00* (2017.01)
*G06T 3/40* (2006.01)

(56) References Cited

U.S. PATENT DOCUMENTS

| | | | | |
|---|---|---|---|---|
| 9,004,753 | B1* | 4/2015 | Maresca, Jr. | G01J 5/0088 |
| | | | | 250/559.42 |
| 9,726,543 | B2* | 8/2017 | Zeng | G06T 7/11 |
| 9,787,913 | B1* | 10/2017 | Koshti | H04N 5/33 |
| 2006/0191622 | A1* | 8/2006 | Ritter | G01N 25/72 |
| | | | | 156/64 |
| 2009/0310815 | A1* | 12/2009 | Chiakpo | G06T 1/20 |
| | | | | 382/100 |
| 2010/0006087 | A1* | 1/2010 | Gilon | F24S 23/70 |
| | | | | 126/572 |
| 2010/0058222 | A1* | 3/2010 | Bergstrom | G06T 11/206 |
| | | | | 715/782 |

* cited by examiner

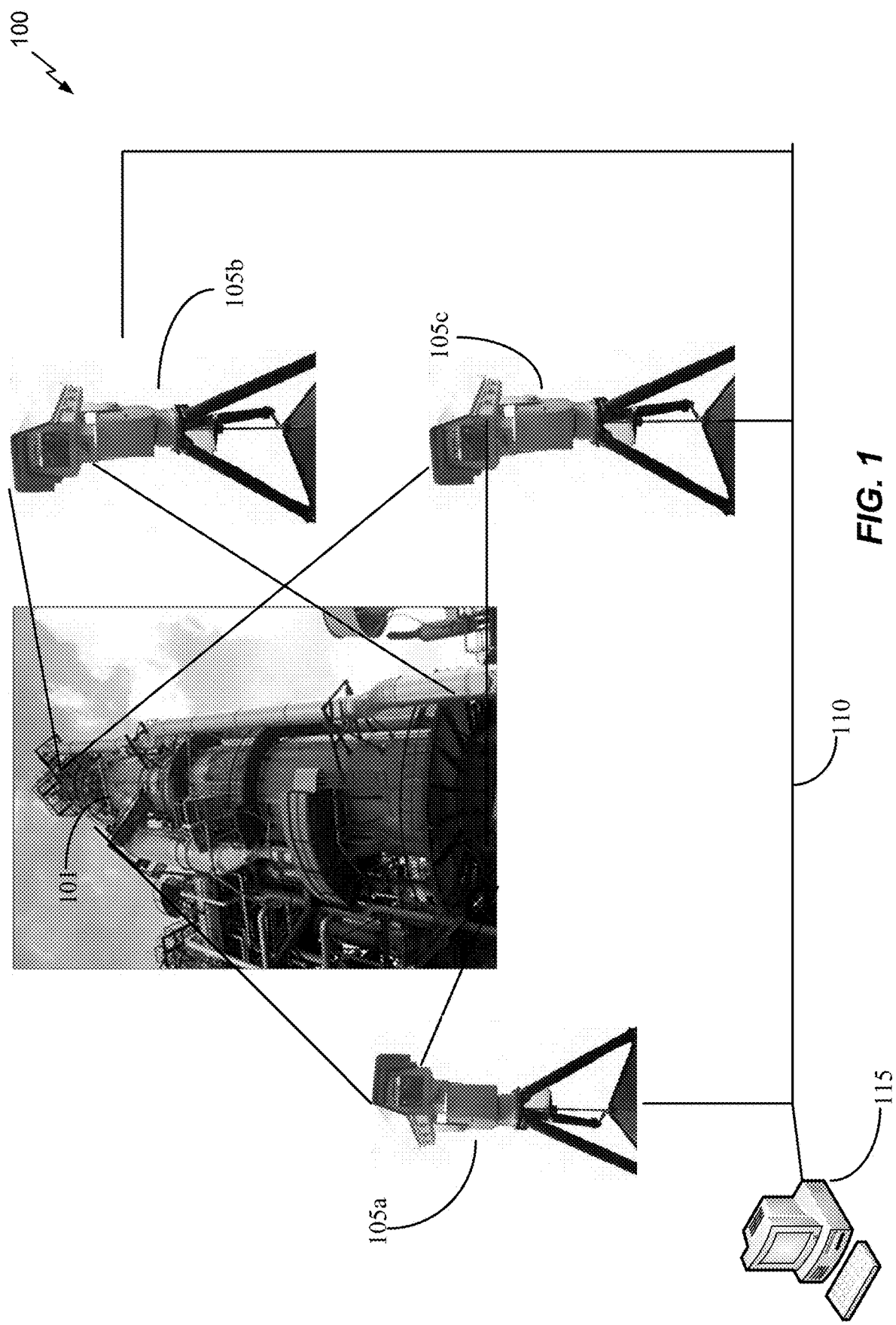

METHODS AND SYSTEMS FOR HOTSPOT DETECTION

CROSS REFERENCE TO RELATED APPLICATIONS

This application claims priority to U.S. Provisional Application No. 62/186,262, filed Jun. 29, 2015, and entitled "INFRARED IMAGING SYSTEMS AND METHODS FOR THERMAL OBJECT MONITORING." The disclosure of this prior application is considered part of this application, and is hereby incorporated by reference in its entirety.

FIELD OF THE INVENTION

The present application relates generally to computer analysis of thermal images. In particular, disclosed are methods and systems for generating alerts when particular regions of a monitored image exceed temperature parameters.

BACKGROUND

Petrochemical cracking is used to break up large hydrocarbon molecules into smaller molecules. This process may be performed with or without a catalyst. In one form of cracking called fluid catalytic cracking, hydrocarbons are mixed with a very fine catalyst powder of aluminum oxide and silicon dioxide. The whole mixture is then blown like a liquid through a reaction chamber at a temperature of approximately 950° F. After the reaction occurs, the catalyst is recovered, and the cracked mixture is separated by cooling and further fractional distillation.

Because of the extremely high temperatures at which petrochemical crackers operate, they may be internally coated with one or more insulating layers to protect structural components. Over time, this insulation may break down, leading to "hot spots" on the external walls of the cracker, and eventual burn through. Hot spots and burn through of cracker structural components result in lost production capacity and substantial losses in revenue as a result. Thus, improved methods of managing petrochemical crackers are required.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the subject matter described herein may be utilized to improve monitoring and alerting of industrial processes.

BRIEF DESCRIPTION OF THE DRAWINGS

FIG. 1 is an overview diagram of a system for monitoring an industrial process, in this case, a petrochemical cracker.

DETAILED DESCRIPTION

Figure 2A:
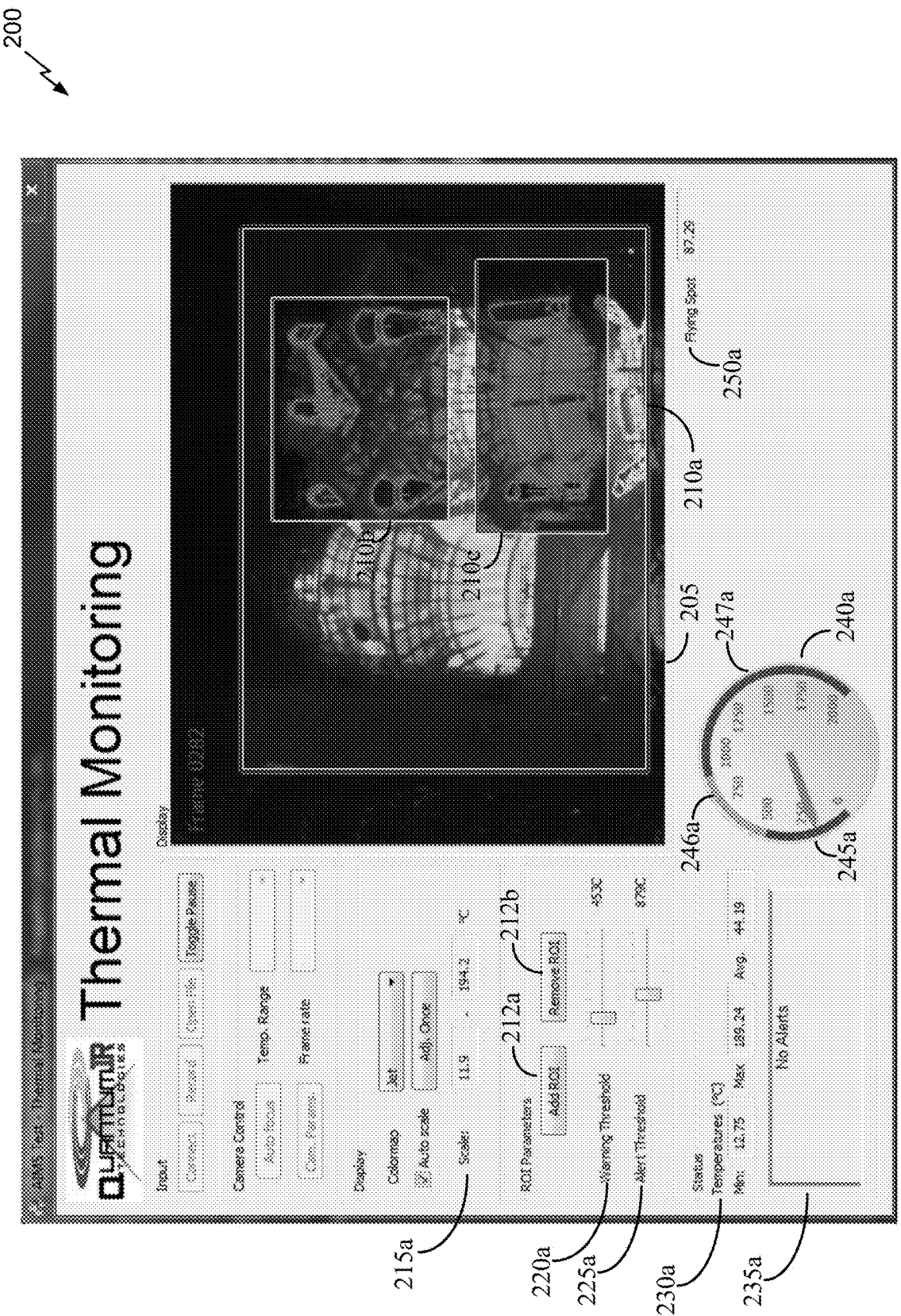
FIG. 2A is a user interface for monitoring temperatures of one or more regions of interest.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different applications and system configurations, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is an overview diagram of a system for monitoring an industrial process, in this case, a petrochemical cracker. The system 100 includes three imaging sensors 105a-c. Each imaging sensor 105a-c is connected to a network 110. Also connected to the network is an image analysis computer 115. The imaging sensors 105a-c may be configured to send image data to the image analysis computer 115 over the network 110.

While FIG. 1 shows three imaging sensors positioned around the petrochemical cracker 101, the number of imaging sensors included in the disclosed systems may vary per embodiment. In some aspects, it may be desirable to achieve 360° coverage of the petrochemical cracker 101, so as to detect hotspots at a large portion of the surface of the petrochemical cracker 101. Thus, in some aspects, systems with 4, 5, 6, 7, 8, 9, or 10 cameras positioned around a single petrochemical cracker are contemplated. As some petrochemical crackers may be of substantial height or length, in some aspects, it may be desirable to position a first set of camera to provide coverage of a first vertical portion of the cracker, and a second set of cameras to provide coverage for a second vertical portion of the cracker. Depending on the length or height of the cracker being monitored, the number of cameras employed in various embodiments can vary substantially.

In some aspects, the imaging sensors 105a-c may be infrared imaging sensors. Infrared imaging sensors may capture wavelengths of light between at least 700 nanometers to 1 millimeter and indicate the captured wavelengths in digital image information transmitted over the network 110 to the image analysis computer 115.

Upon receiving the digital image information from the imaging sensors 105a-c, the image analysis computer 115 may analyze the image information to determine temperature information at various locations around the cracker 101. A user may establish one or more warning or alert levels for one or more regions of interest within the digital image information, and the image analysis computer 115 may generate one or more warnings and/or alerts if the established alerting levels are exceeded. This may enable an operator to identify problems with the operation of the cracker 101 earlier than previously possible, resulting in less damage to the cracker 101 and reduced production outages, resulting in increased revenue for a refinery operating the cracker 101.

FIG. 2A is a user interface for monitoring temperatures of one or more regions of interest. FIG. 2A shows an image 205 including regions of interest 210a-c. One or more boundaries of the regions of interest 210a-c may be configured via user interface controls 212a-b.

In some aspects, the image 205 may be received from a single imaging sensor, such as any one of imaging sensors 105a-c shown in FIG. 1. In some aspects, the image 205 may be generated by stitching together two or more images from two or more imaging cameras, such as any two or more of the imaging sensors 105a-c shown in FIG. 1. The video stitching of images from multiple imaging sensors may be performed by any of the methods known in the art. For example, in some aspects, OpenCV may be used to perform video stitching. Some aspects may utilize Video Stitch Studio by Video Stitch of Paris, France. Other aspects may use other methods.

The user interface 200 also includes scale indicator 215a, a warning threshold control 220 and an alert threshold control 225. The scale indicator determines a graphical resolution of temperature ranges rendered within a region of interest of the image 205. For example, a smaller or narrower temperature range may provide an image that can communicate more fine detail between temperatures of the image, while a larger scale may obscure smaller temperature changes within the image.

The warning and alert threshold controls 220 and 225 respectively allow a user to set independent thresholds for warning and alert indicators. The example shown in FIG. 2A provides a warning threshold at a temperature of 453° C., and an alert threshold at a temperature of 879° C.

The user interface 200 also includes a temperature status indicator 230. The temperature status indicator includes a minimum, maximum, and average temperature currently detected within the selected region of interest 210a. The alert window 235 currently shows no alerts, as none of the minimum, maximum, or average temperatures shown in the status indicator 230 have exceeded either of the warning or alert thresholds discussed above.

The user interface 200 also includes a temperature gauge 240. The temperature gauge shows a current maximum temperature detected within the selected region of interest. In the example of FIG. 2A, the temperature shown is 189.24, which is consistent with the temperature status indicator 230a. The temperature gauge indicates a temperature range below the warning level 245a set by warning threshold control 220a. The temperature gauge 240 also indicates a temperature range 246a between the warning level set by the warning threshold control 220 and the alert level set by the alert threshold control 225. The temperature gauge also shows a temperature range 247a above the temperature set by the alert threshold control 225.

User interface 200 also includes a flying spot indicator 250a. The flying spot indicator provides an indication of a temperature at a position (or pixel) in the image 205 that a pointing device may be hovering over.

In the embodiment of FIG. 2A, each region of interest 210a-c may include its own separate parameters, such as the scale indicator 215, warning and alert thresholds 220 and 225, temperature status 230, and temperature gauge 240 discussed above. By selecting each of the regions of interest 210a-c individually, the display of the user interface 200 may switch so as to display parameters corresponding to the selected region of interest. To edit one or more parameters for a region of interest, the region of interest is selected, for example, via a pointing device such as a mouse by clicking on the region of interest 210a-c. The parameters corresponding to that selected region of interest are then displayed, and may be edited directly via the user interface 200.

Figure 2B:
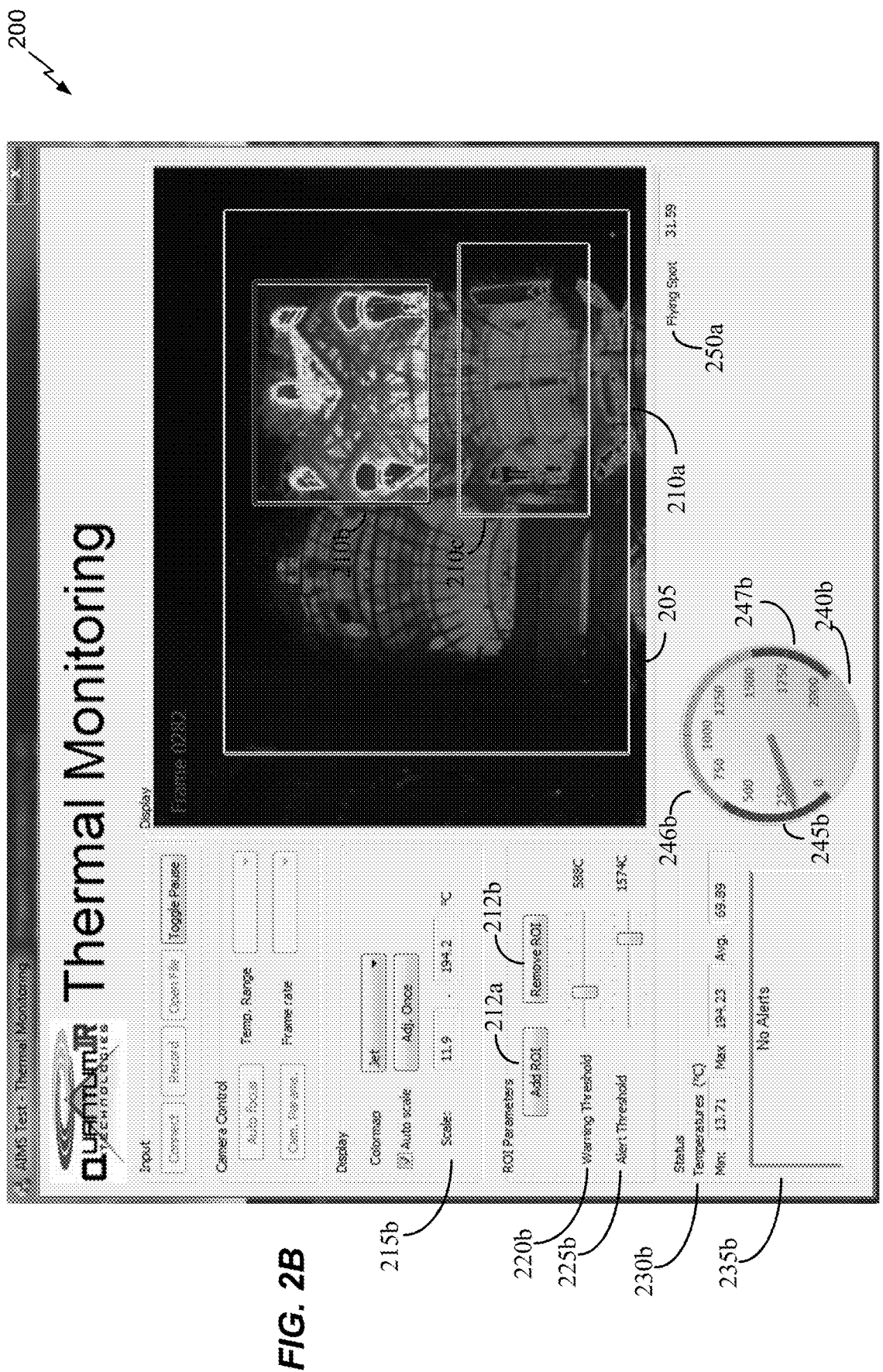
FIG. 2B shows another view of the user interface 200 with a different region of interest selected than in FIG. 2A.

FIG. 2B shows another view of the user interface 200 with a different region of interest selected than in FIG. 2A. Specifically, in FIG. 2B, region of interest 210b is selected. Since region of interest 210b is selected, the user interface 200 displays parameters specific to the selected region of interest. The scale parameters between FIG. 2A (215a) and FIG. 2B (115b) are unchanged. However, each of the warning thresholds 220a-b, alert thresholds 225a-b, temperature status indicators 230a-b, temperature gauges 240a-b, and corresponding temperature ranges 245a-b, 246a-b, and 247a-b are different between FIGS. 2A-B respectively. This reflects temperature differences between the two separate portions of the image 205 included in each of the separate region of interests 210a-b.

Figure 2C:
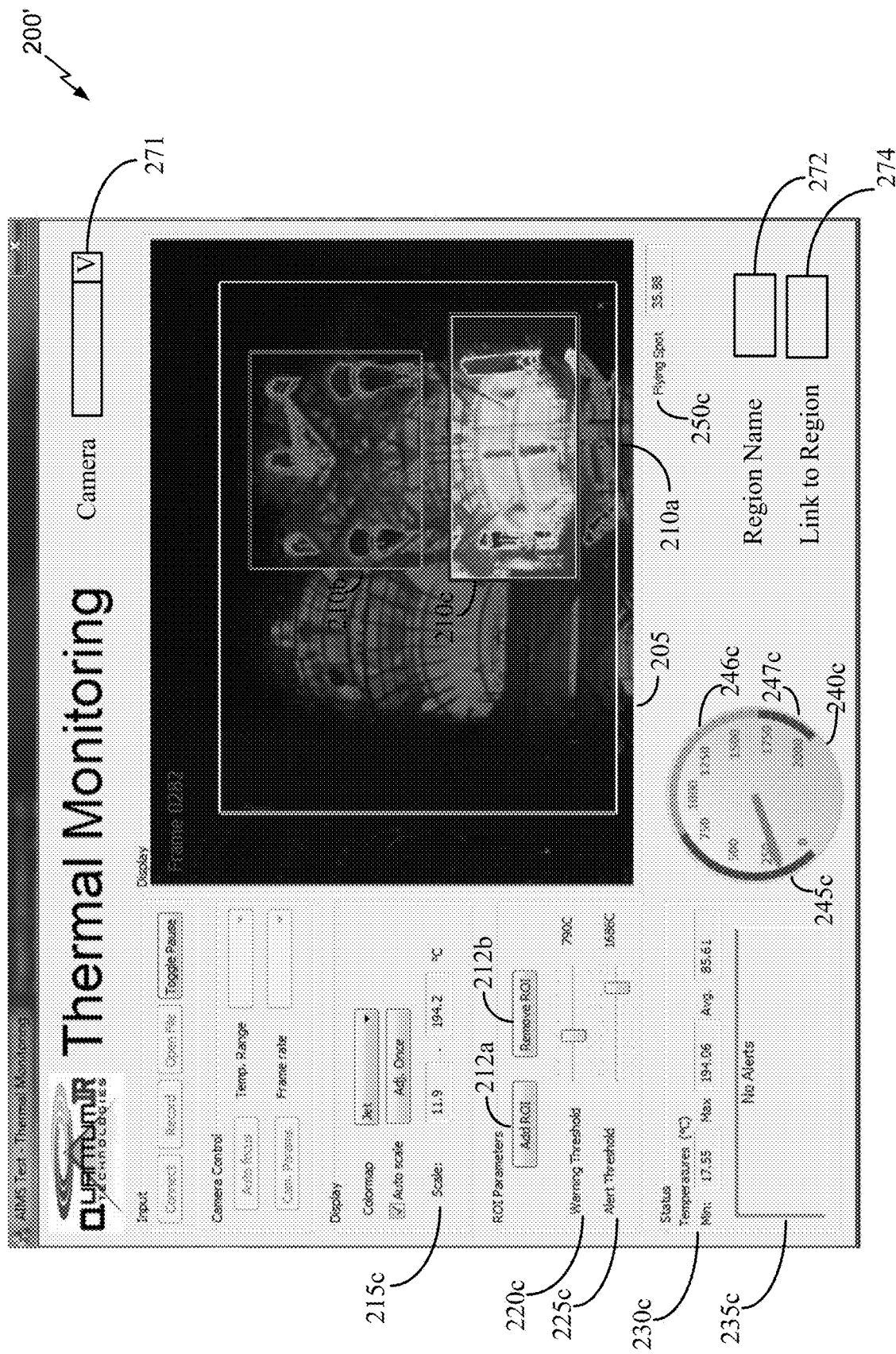
FIG. 2C shows a modified version of the user interface 200' with region of interest 210c selected.

FIG. 2C shows a modified version of the user interface 200' with region of interest 210c selected. The user interface 200' displays parameters specific to the selected region of interest 210c. The scale parameters between FIG. 2A (215a) and FIG. 2C (215b) are unchanged. However, each of the warning thresholds 220a and 220c, alert thresholds 225a 225c, temperature status indicators 230a 230c, temperature gauges 240a 240c, and corresponding temperature ranges 245a 245c, 246a 246c, and 247a 247c are different between FIGS. 2A and 2C respectively. This reflects temperature differences between the two separate portions of the image 205 included in each of the separate region of interests 210*a* and 210*c*.

As discussed above, in some aspects, the image 205 may be generated by stitching together images captured by multiple imaging sensors. User interface 200' is modified relative to user interface 200 of FIGS. 1A and 1B to show an alternative embodiment for providing for the management of images from multiple imaging cameras. In user interface 200', a camera selection field 271, region name field 272 and link to region field 274 are included. The camera selection field 271 allows a user/operator to select between a plurality of imaging sensors, such as imaging sensors 105*a-c*, that may be under control of, for example, the image analysis computer 115 illustrated in FIG. 1. When a particular imaging sensor 105*a-c* is selected in the camera selection field 271, the image 205 shown in the user interface 200' may be received from the selected camera. In this particular embodiment, each region of interest shown in the image 205, such as regions of interest 210*a-c*, may be imaging sensor specific. In other words, the system 100, or more specifically the image analysis computer 115, may maintain separate parameters for each imaging sensor utilized by the system 100. The separate parameters may include the number, names (see below) and configurations of regions of interest for each imaging sensor, warning and alert levels for each region of interest, and any linking between regions of interest, both within an image captured by one imaging sensor or across multiple images captured by multiple imaging sensors. A list of imaging sensors available for selection in the camera selection field 271 may be generated based on configuration data providing the list of imaging sensors and indications of how imaging data may be obtained from the listed imaging sensors. Creation of this configuration data is not shown but is straight forward for one of skill in the art.

The region name field 272 allows each region of interest 210*a-c* to be named by an operator/user. The value in the region name field 272 may change as each region of interest 210*a-c* is selected so as to display a name associated with the selected region of interest. Thus, region name field may be a read/write field, in that a current value is displayed but can be overwritten by a user/operator, with the overwritten value becoming the new current value.

The link to region field 274 allows entry of a second region of interest that is linked to the currently selected region of interest. The link to region field 274 may be useful for example, to link regions of interest of multiple cameras such that the regions of interest are processed as a group as described in more detail below. In some aspects, linking a selected region of interest to another region of interest may disable one or more of the warning threshold control 220*c* and/or alert threshold control 225*c* for the region of interest being linked. For example, linked regions may share warning and alert thresholds in some aspects, and thus this information may be entered, in some aspects, only when a "master" region is selected. For example, if regions of interest A, B, and C are linked, with region A being the master region, alerts for the regions A, B, and C may be configurable only when region A is selected within the user interface 200. A "master" region of interest is a region of interest that does not identify any other region of interest in its corresponding link to region field 274, but that is linked to by other regions of interest. Non-master regions of interest may identify the "master" region of interest in their respective link to region fields 274.

Figure 2D:
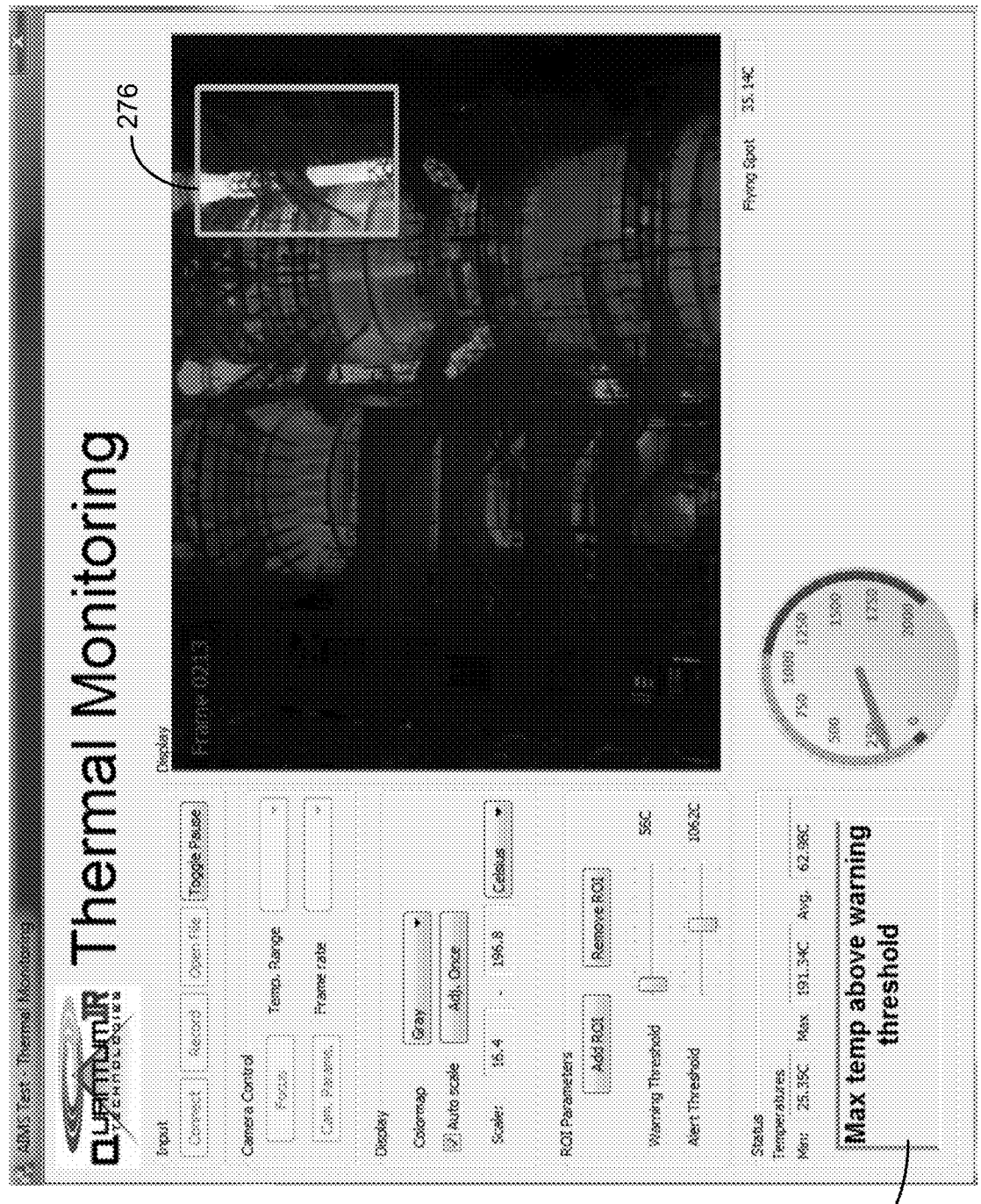
FIG. 2D shows another embodiment of a user interface.

FIG. 2D shows another embodiment of a user interface 275. The embodiment shown in FIG. 2D includes a single region of interest 276. An alert window 235*d* shows an example of a display when a warning threshold has been exceeded.

Figure 2E:
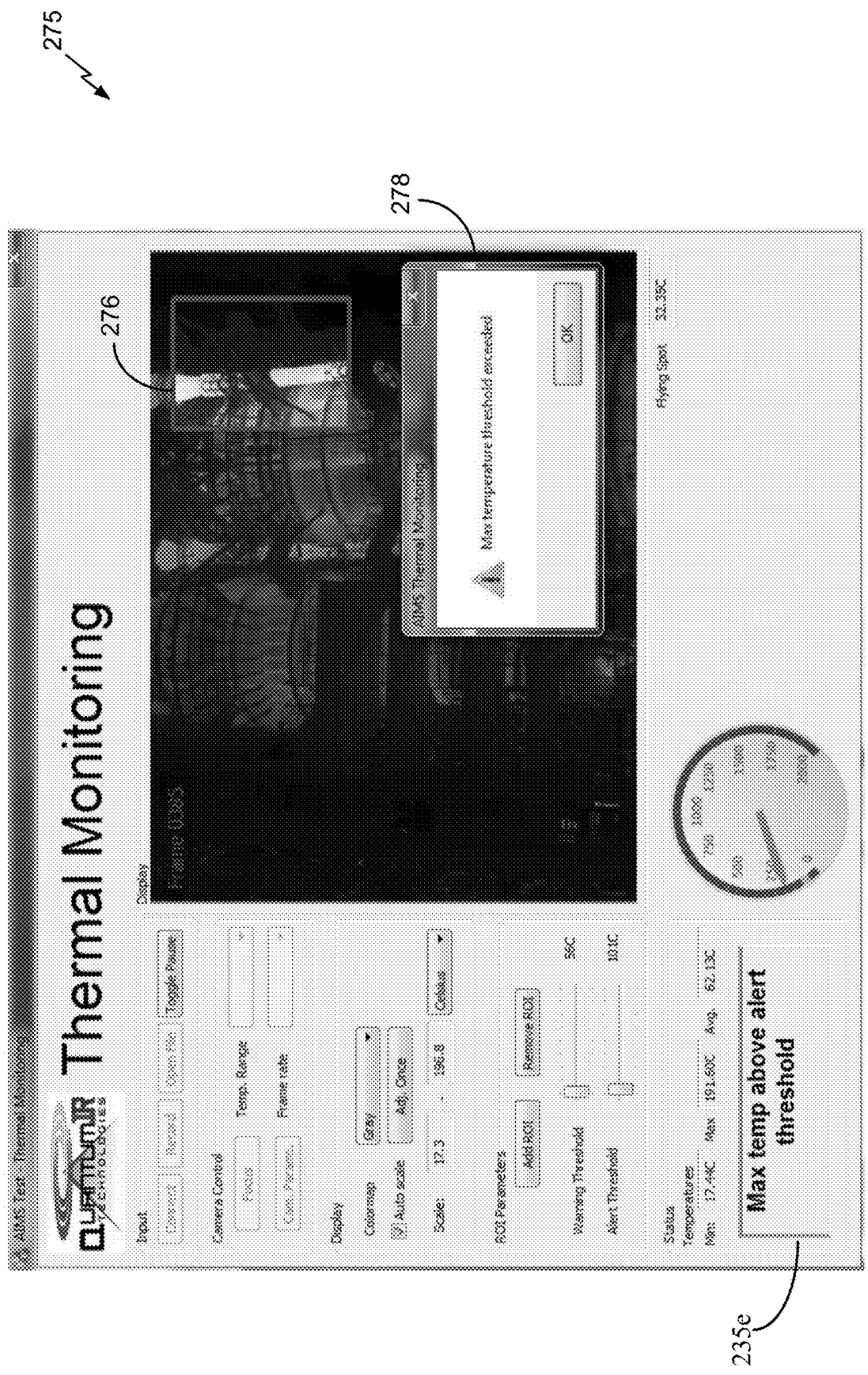
FIG. 2E shows another embodiment of a user interface.

FIG. 2E shows another embodiment of the user interface 275. The disclosed embodiment of FIG. 2E includes the single region of interest 276. The alert window 235*e* shows that a maximum temperature alert has been exceeded. An additional dialog 278 emphasizing the max temperature alert is also displayed. Note that while user interface 275 of FIGS. 2D-E does not show the region name field 272 or link to region field 274, implementations incorporating the warning level alert window 235*d* and/or maximum alert dialog(s) 235*e* and 276 of FIG. 2E and also including one or more of the region name field 272 and/or link to region field 274 are contemplated.

Figure 2F:
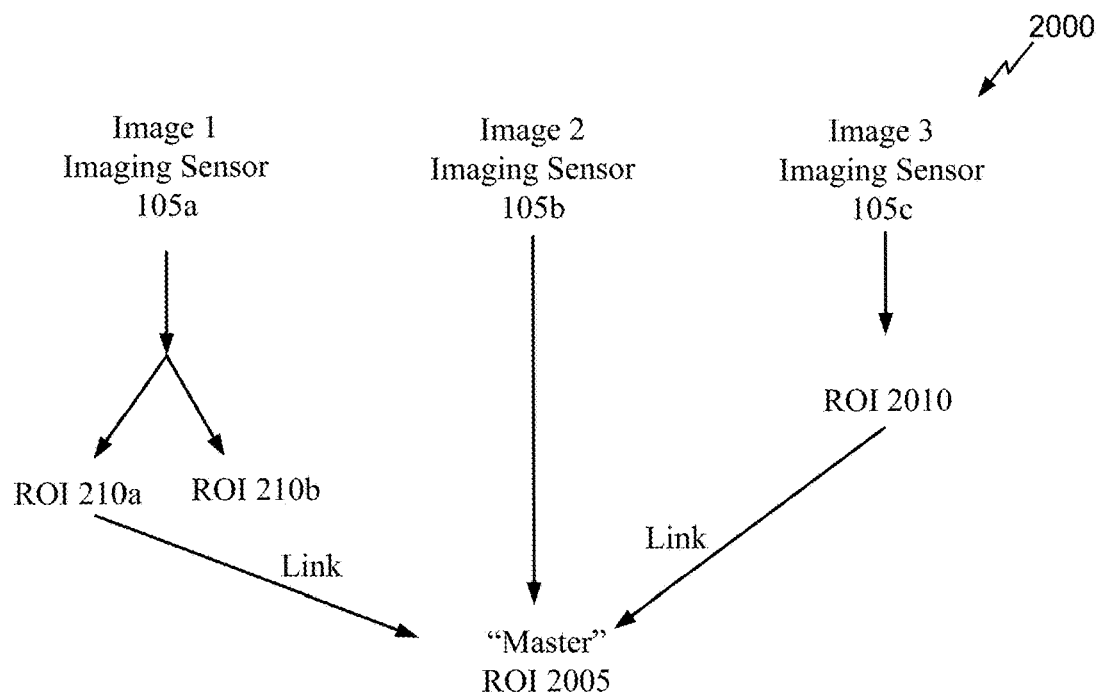
FIG. 2F is a data flow for data received from a plurality of imaging sensors.

FIG. 2F is a data flow 2000 for data received from a plurality of imaging sensors 105*a-c*. As discussed above, in some embodiments, a region of interest may 'link" to another "master" region of interest, so as to share data associated with the master region of interest, such as warning and alert thresholds. For example, as shown above in FIG. 2C, the link to region field 276 may be used to accomplish this.

FIG. 2F shows three images (image 1, image 2, and image 3) captured by three imaging sensors 105*a-c*. Note that in the embodiment utilizing the data flow 2000, any one of image 1, image 2, or image 3 may correspond to image 205 shown in FIGS. 2A-C. Image 1 from imaging sensor 105*a* may include two regions of interest 210*a-b* as shown. Image 2 captured by imaging sensor 105*b* includes one region of interest, ROI 2005. Image 3 captured by imaging sensor 105*c* includes one region of interest ROI 2010. Both ROI 210*a* and ROI 2010 "link", for example, via the link to region field 274 of FIG. 2C, to the ROI 2005. ROI 2005 is a "master" ROI in this example, in that ROI 2005's warning and alert thresholds are also applied to ROIs 210*a* and ROI 2010. Regions of interest that are linked together, or otherwise associated, for example, via the link to region field 276 of FIG. 2C, may be referred to as a region of interest group throughout this disclosure. For example, the combination of ROI 2005, ROI 2010, and ROI 210*a* may be considered an ROI group. ROI 210*b* is not part of this ROI group, because it is not linked or otherwise associated with the ROIs 2005, 1010, and 210*a*.

Note that while FIG. 2F shows three imaging sensors and three images, along with examples of regions of interest defined in each of those images, one of skill in the art would recognize that the data flow shown in FIG. 2F is just an example. Some aspects may include images from two or more imaging sensors, including 3, 4, 5, 6, 7, 8, 9, 10, 12, 15, or 20 imaging sensors. An image from a single imaging sensor may each include 0, 1, 2, 3, 4, 5, 6, 7, 8, 9, 10 or any number of regions of interest, any of which may be linked to another region of interest. Additionally, while FIG. 2F shows only two levels of linking of regions of interest, with RIOs 210*a-b* and ROI 2010 being at a first level and ROI 2005 being a master ROI at a second level, additional levels of linking are contemplated. For example, in some aspects, the master ROI 2005 may itself link to another region of interest, and "inherit" at least warning and/or alert threshold(s) from the other region of interest.

Figure 2G:
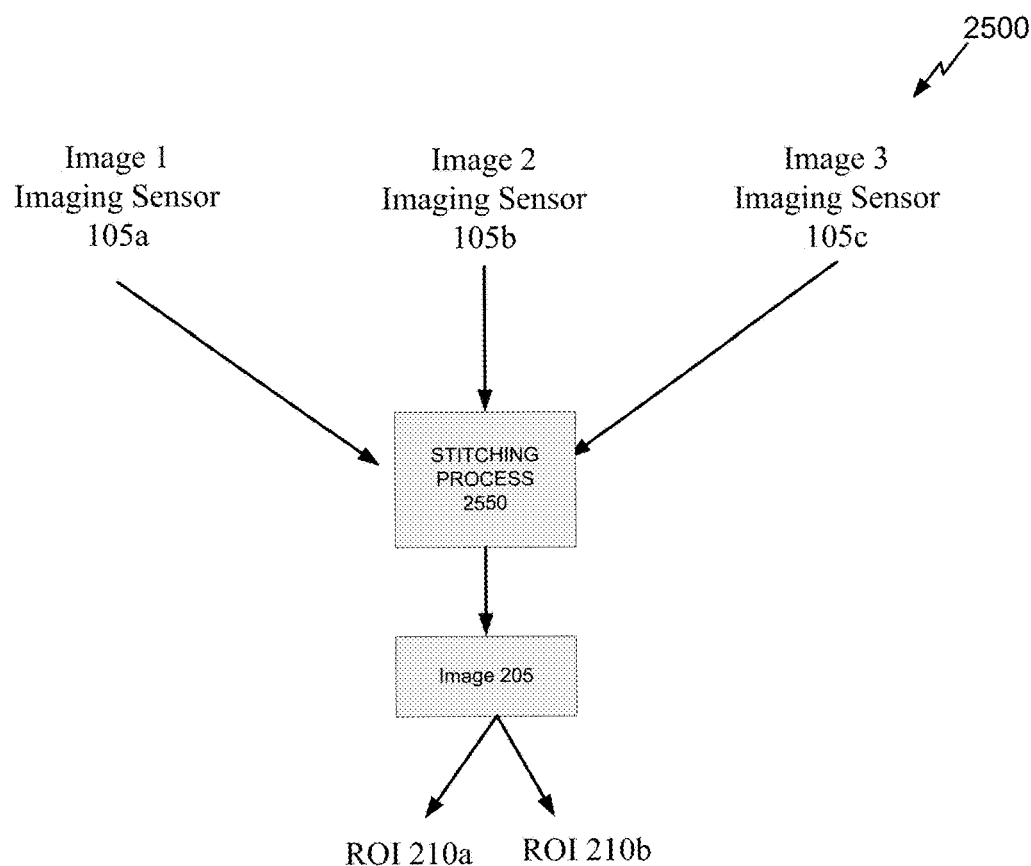
FIG. 2G shows an alternative data flow 2500 for data received from multiple imaging sensors.

FIG. 2G shows an alternative data flow 2500 for data received from multiple imaging sensors. In FIG. 2G, at least portions of image 1, image 2, and image 3 are stitched together via stitching process 2550. Image 205, as shown in FIGS. 2A-C for example, is generated by the stitching process 2550. One or more regions of interest may then be defined within the image 205, such as regions of interest 210a-b, also shown in FIGS. 2A-C. In some aspects, the data flow of FIG. 2G may be combined with the data flow in FIG. 2F, where image data from a subset of a plurality of imaging sensors are stitched together, as shown in FIG. 2G, while regions of interest defined within images from individual cameras and/or stitched images from multiple cameras, are linked together via the data flow shown in FIG. 2F.

Figure 3:
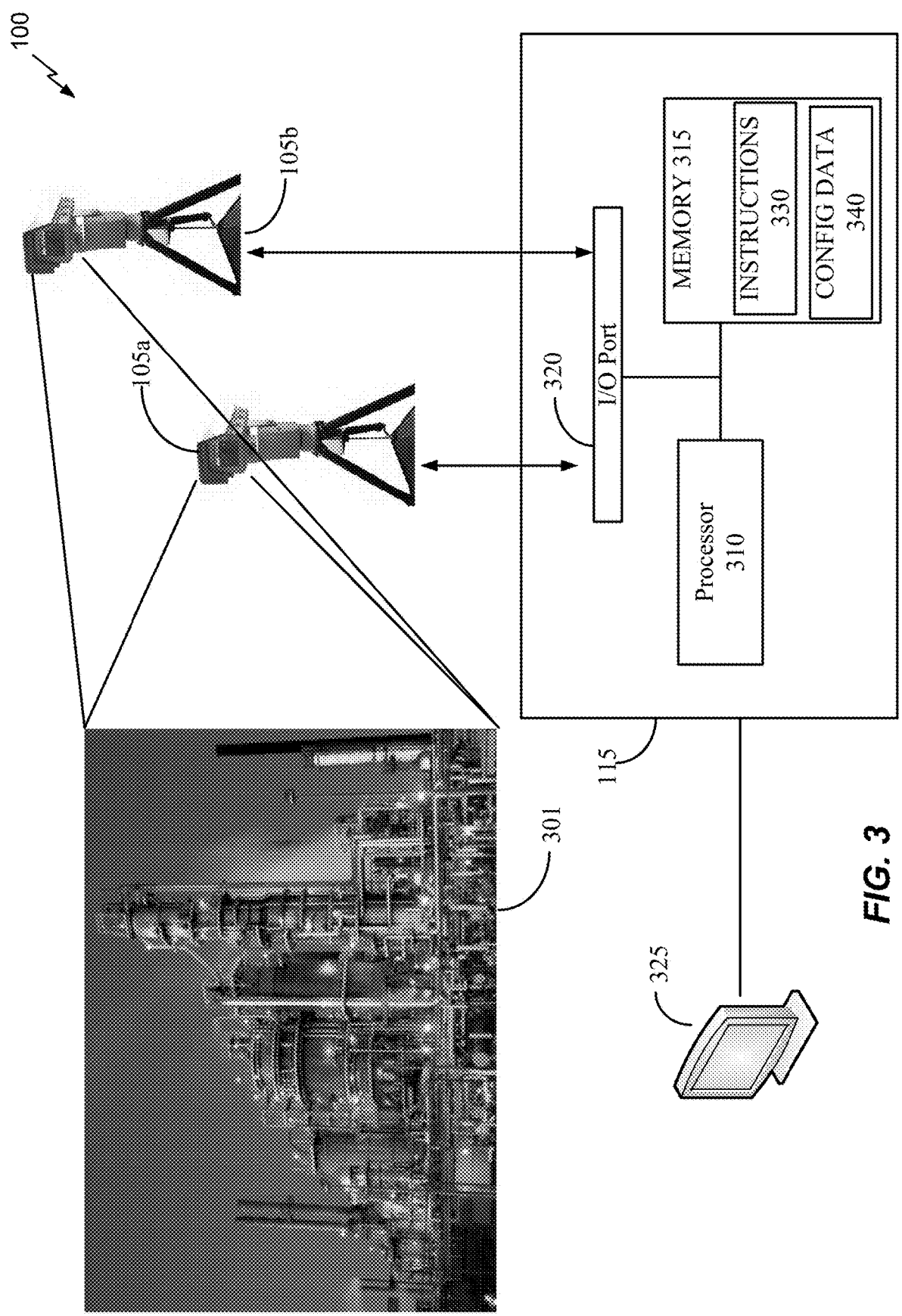
FIG. 3 is a diagram showing one embodiment of the system of FIG. 1.

FIG. 3 is a diagram showing one embodiment of the system 100 discussed above. FIG. 3 shows a scene 301 imaged by imaging sensors 105a-b. As described above with respect to system 100 of FIG. 1, in some aspects, the imaging sensors may capture infrared wavelengths of light and convert the captured wavelengths into digital data.

An image analysis computer 115 includes an electronic hardware processor 310, electronic hardware memory 315, and an I/O port 320. The image analysis computer 115 is operably connected to an electronic display 320. Via the I/O port 320, the processor 310 may communicate with the imaging sensors 105a-b. For example, the processor 310 may be configured to transmit one or more configuration parameters to one or more of the imaging sensor 105a-b, and command the imaging sensors 105a-b to capture one or more images. The processor 310 may further be configured to receive digital images from the imaging sensors 105a-b, capturing different perspectives of the scene 301.

The memory 315 may store instructions 330 that configure the processor 310 to perform one or more of the functions disclosed herein. For example, the memory may store instructions 330 that configure the processor 310 to retrieve an image from the imaging sensor(s) 105a-b and display the image on the electronic display 325. The memory may include further instructions 330 that configure the processor 310 to define one or more regions of interest in one or more images captured by one or more imaging sensors, and monitor temperatures present in the regions of interest through successive images captured from the imaging sensor(s) 105a-b. In some aspects, the memory 315 may include instructions 330 that configure the processor 310 to set warning and/or alert threshold values for temperatures within one or more regions of interest defined in the image(s) of the scene 301, and generate warnings and/or alerts when those threshold values are exceeded. The memory may also store configuration data 340. The configuration data may include configuration data for the imaging sensor 304, and/or configuration data to support the user interface 200 and/or 200' shown with respect to FIGS. 2A-C. For example, one or more of the parameters 215a-c, 220a-c, 225a-c and/or configuration parameters defining the number and positions of the regions of interest within the image 205 may be stored as configuration data 340.

Figure 4:
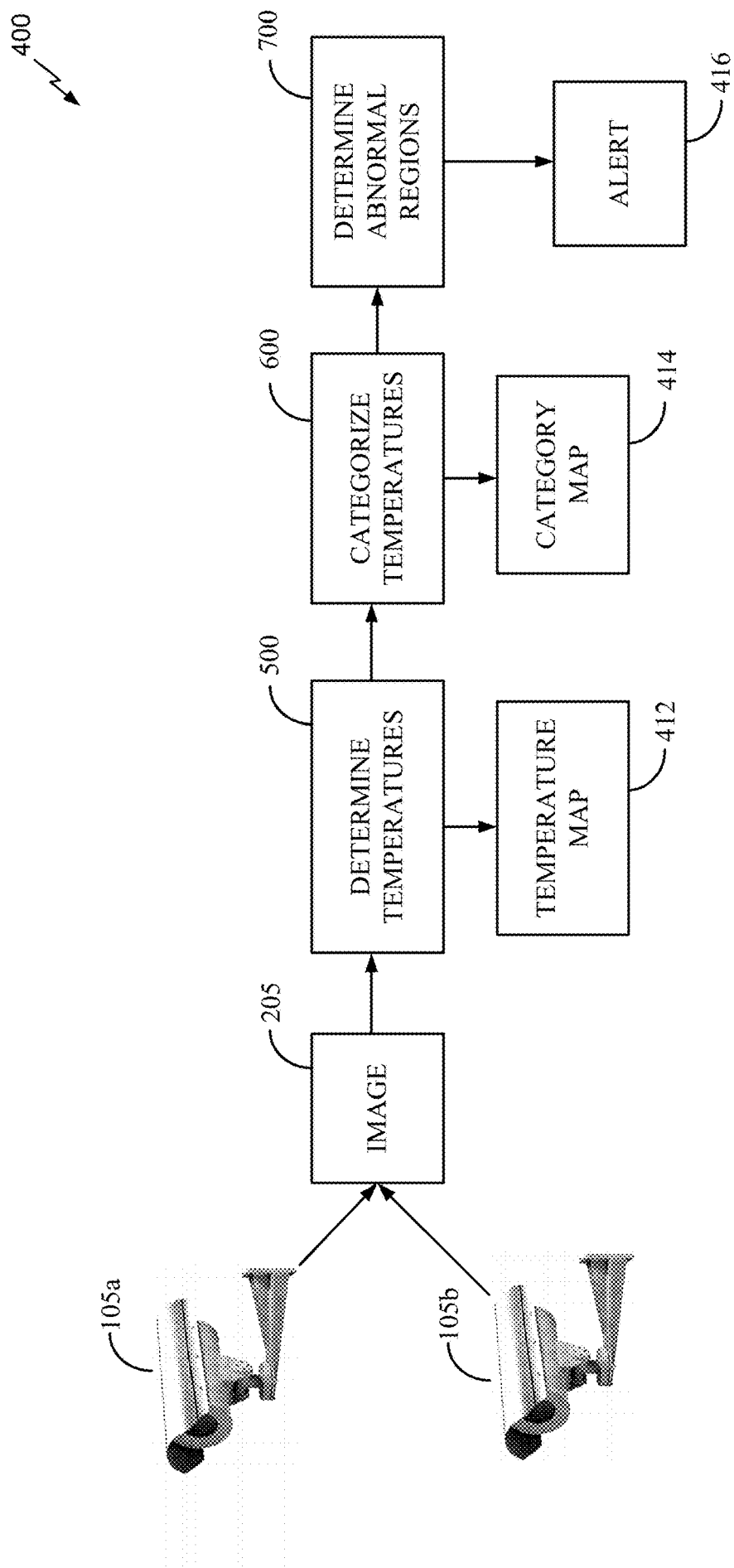
FIG. 4 is a dataflow diagram of one exemplary embodiment of the methods and systems disclosed.

FIG. 4 is a dataflow diagram of one exemplary embodiment of the methods and systems disclosed. From the left, image data from the image sensors 105a-b are stitched together to form an image 205. In some aspects, the image 205 may be generated based on image data from only a single imaging sensor, or more than two imaging sensors.

The image 205 includes an array of pixel values. Each pixel value represents wavelengths of light captured at a position corresponding to the pixel's location within the array. The image 205 is then provided to a process 500 which determines temperatures based on the pixel values in the image 205. The process 500 creates a temperature map 412. In some aspects, for each pixel value in the image 205, there is a corresponding temperature value in the temperature map 412. After process 500 completes, process 600 categorizes the temperature values included in the temperature map 412 to produce a category map 414. The category map 414 may include a value for each temperature value in the temperature map 412. Each value in the category map 414 may indicate whether a corresponding temperature value in the temperature map 412 is within a normal range or is categorized as abnormal.

After the category map is generated by process 600, one or more abnormal regions are determined by process 600. Based on the abnormal regions, process 700 may generate one or more alerts 416.

While process 400 is serialized in the preceding discussion, one of skill in the art would understand that at least portions of process 300 may be performed in parallel in some operative embodiments. For example, process 600 could begin operation after only a portion of the temperature map 412 was completed. Process 600 could categorize the completed portion(s) of the temperature map 412 while process 500 continued to populate the temperature map 412 with additional temperature information. Similarly, process 700 could determine abnormal regions within the image 205 before the temperature map 412 and/or the category map 314 were completed. Therefore, in various embodiments, one or more of processes 500, 600, and 700 could run at least partially in parallel.

Figure 5:
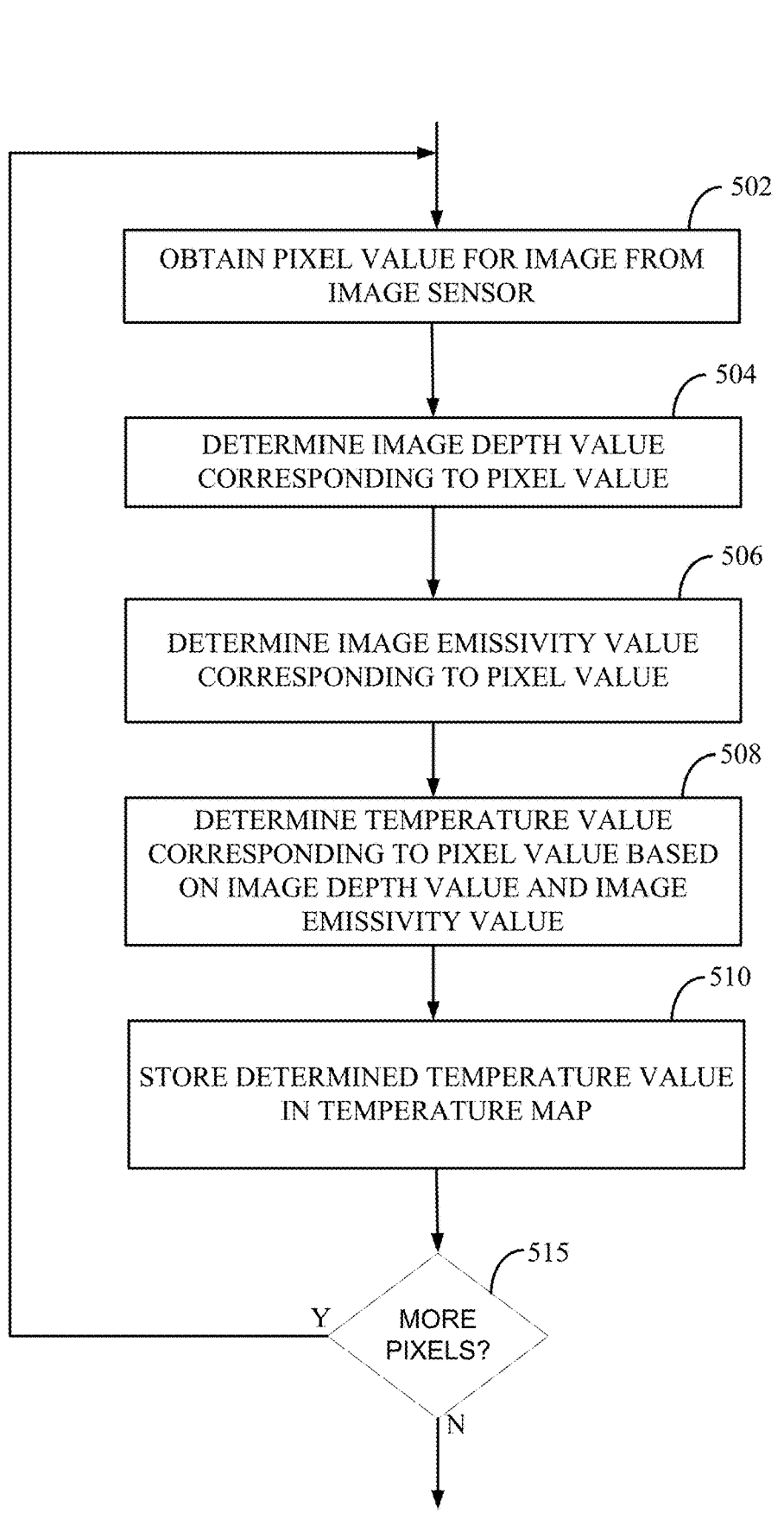
FIG. 5 is a flowchart of a method of determining temperature values for pixels in an infrared image.

FIG. 5 is a flowchart of a method of determining temperature values for pixels in an infrared image. In some aspects, the functions discussed below with respect to process 400 may be performed by the processor 310, discussed above with respect to FIG. 3. For example, instructions 330 stored in the memory 315 may configure the processor 310 to perform one or more of the functions discussed below.

In block 502, a pixel value for an image from an infrared sensor is obtained. In some aspects, the image may be captured from one of the imaging sensors 105a-c, discussed above with respect to FIG. 1. In some aspects, one or more of the imaging sensors 105a-c may record wavelengths of light between 700 nanometers and 1 mm (infrared wavelengths) and represent the captured light as a digital image. The pixel value received in block 502 may be one pixel value from an array of pixel values included in the captured image.

In block 504, a depth value corresponding to the pixel value is obtained. In some aspects, the depth value may be obtained from a depth map of the image. The depth map may be obtained, in some aspects, via a ranging device, such as a radio detection and ranging (RADAR) or light and radar or LIDAR device. In some aspects, the depth map may be obtained using structured light.

In block 506, an emissivity value corresponding to the pixel value is obtained. In some aspects, the emissivity value may be based on a setting of the imaging sensor referenced in block 502. For example, in some aspects, the imaging sensor may be configured to capture objects of a given emissivity. This emissivity value may be used in block 506. In some aspects, an object database may include emissivity of known objects. In some aspects, an emissivity value of an object being searched for in the image may be used. For example, in some aspects that may be imaging a steel pipe, an emissivity of steel may be used. This emissivity value may be configured by a user in some aspects.

In block 508, a temperature value corresponding to the pixel value is determined based on the corresponding depth value and emissivity value. In some aspects, block 508 may include translation of a raw value from the imaging sensor into a power value. For example, in some aspects, the imaging sensor may provide imaging values in digital numbers (DNs). In some aspects, the power value may be determined using Equation 1 below:

$$\text{power} = \frac{RawSignalValue - CameraOffset}{CameraGain} \quad (1)$$

The determined power value may be considered an image irradiance in watts per steradian per square meter.

A signal value may then be determined from Equation 2 below:

$$\text{Signal} = K_1 \times \text{power} - K_2, \quad (2)$$

where:

$$K_1 = \frac{1}{\tau_{Atm} \times Emissivity \times ExtOptTransm},$$

$$K_2 = \frac{1 - Emissivity}{Emissivity \times AtmObjSig} + \frac{1 - \tau_{Atm}}{Emissivity \times \tau_{Atm} \times AtmObjSig} + \frac{1 - ExtOptTransm}{Emissivity \times \tau_{Atm} \times ExtOptTransm \times ExtOptTempObjSig}$$

$\tau_{Atm}$ The transmission coefficient of the atmosphere between the scene and the camera. $\tau_{Atm}$ is a function of spectral response parameters, object distance, relative humidity, etc.

ExtOptTransm: External Optics Transmission is the transmission of any optics (e.g. a protective window) between the object being imaged and the optics of the imaging sensor. The external optics transmission is a scalar value between zero and one. External optics that do not dampen the measurement have a value of one, and optics that completely sampan the measurement have a value of zero.

ExtOptTempObjSig The temperature of any optics (e.g., a protective window) between the object being imaged and the optics of the camera Emissivity The emissivity of the object whose temperature is being determined.

To convert the signal calculated via Equation 2 above to a temperature value, some implementations may utilize Equation 3 below:

$$\text{Temperature} = \frac{B}{\log\left(\frac{R}{Signal} + F\right)}, \quad (3)$$

where:

B, R, and F may be calibration parameters retrieved from the imaging sensor.

The determined temperature value may be in degrees Kelvin.

In block 510, the determined temperature value is stored in a temperature map. The temperature map may be used as input for one or more of the processes discussed below. A temperature map may be a data structure that stores temperature values for at least a portion of pixels in an image or region of interest. In some aspects, the temperature map may be stored in the memory 315.

Decision block 515 determines whether there are additional pixels to process in the image (or region of interest). If there are additional pixels, processing returns to block 502. Otherwise, processing continues below (not shown).

Figure 6:
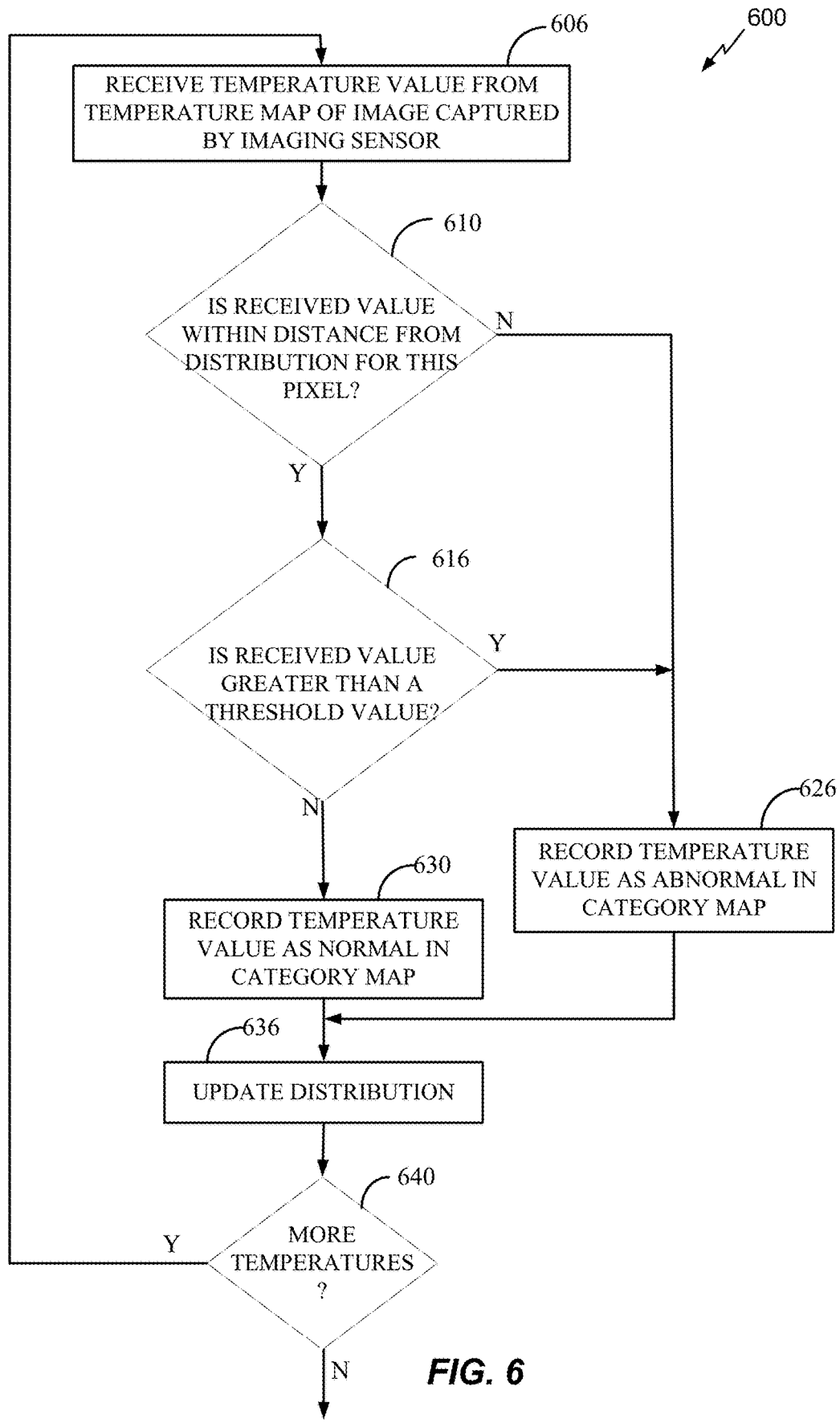
FIG. 6 is a flowchart of a method of generating a category map indicating normal and abnormal pixels.

FIG. 6 is a flowchart of a method of generating a category map indicating normal and abnormal pixels. In some aspects, the process 600 may be performed by the processor 310, described above with respect to FIG. 3. For example, in some aspects, instructions stored in the memory 315 may configure the processor 310 to perform one or more of the functions discussed below with respect to process 600.

In the illustrated embodiment, process 600 utilizes two different approaches to determine whether a pixel is within a "normal" range. A first approach compares a temperature value to a statistical distribution based on historical values for the same pixel. To the extent the temperature value is within a specified distance from the distribution, the pixel may be considered within a "normal" range. However, in a scenario that includes temperatures changing gradually over time, process 600 may not detect a pixel that indicates an extremely high temperature rating using this first technique, as the higher temperatures may gradually become a new "normal", as the higher temperatures may change the nature of the distribution over time. To avoid this possibility, process 600 may compare the temperature value to a threshold value that defines a maximum value of normal, regardless of historical values. By combining a comparison to historical values and to a threshold value, process 600 provides a robust characterization of a current temperature value as either "normal" or "abnormal."

In block 605, a temperature value is received from an imaging sensor. In some aspects, the imaging sensor may capture infrared wavelengths of light and convert the captured light into digital data which forms an array of temperature values. The temperature value received in block 605 may be one temperature value in the array of temperature values.

Block 610 determines whether the temperature value is within a specified distance from a statistical distribution. The statistical distribution may be based on historical values of the pixel. In some aspects, the distance from the distribution is a Mahalanobis distance. For example, in some aspects, if the squared Mahalanobis distance is greater than the inverse chi squared cumulative distribution function at a specified probability (e.g. 0.99), then it is within the distribution. Otherwise, it is outside of the distribution in some aspects.

In some aspects, block 610 may make different determinations. For example, in some aspects, block 610 may determine whether the temperature value is within a distance representing 90%, 95%, or 99% of the statistical distribution. If the received value is not within the specified distance from the distribution, process 600 moves to block 626, which marks the pixel as abnormal in a pixel map.

If the temperature value is within the specified distance, process 600 moves from decision block 610 to decision block 616, which determines whether the temperature value is above a threshold value. The threshold value referenced in block 616 may be based on user configured information. The configured information may be specific to an image (generated by a single imaging sensor or generated by stitching together data from multiple imaging sensors), or a region of interest within an image. If the temperature value is above the threshold value, process 600 moves to block 626, which marks the temperature value as abnormal as discussed above.

Otherwise, if the temperature value is not greater than the threshold value, process 600 moves from decision block 616 to block 630, which records the temperature value as normal in the pixel map. After either of blocks 626 or 630 are completed, process 600 moves to block 636, which updates the distribution based on the temperature value.

After the distribution is updated in block 636, process 600 moves to decision block 640, which determines if there are more pixels in an image to process. If there are, process 600 returns to block 605 and processing continues from block 605. If there are no more pixels, processing may continue below (not shown).

Figure 7:
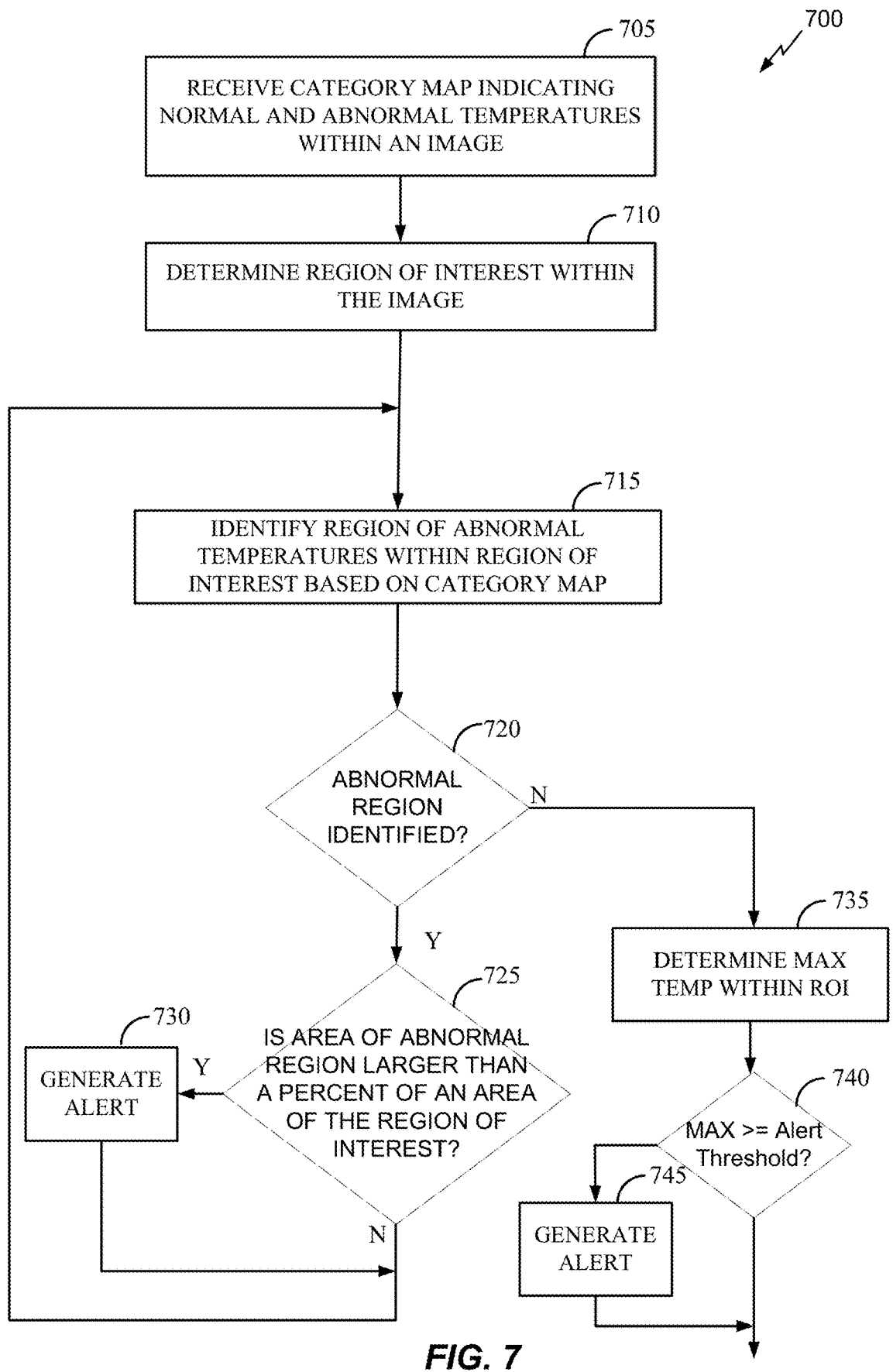
FIG. 7 is a flowchart of a method of generating an alert based on an abnormal region within a region of interest of an image captured by an imaging sensor.

FIG. 7 is a flowchart of a method of generating an alert based on an abnormal region within a region of interest of an image. In some aspects, the image is captured from a single imaging sensor. In some other aspects, the image may be generated by stitching together image data captured by multiple imaging sensors. In some aspects, process 700 may be performed by the processor 310, discussed above with respect to FIG. 3. For example, in some aspects, instructions 330 in the memory 315 may configure the processor 310 to perform one or more of the functions discussed below with respect to FIG. 7.

In block 705, a category map is received indicating normal and abnormal temperature values within the image. For example, in some aspects, a category map may represent a matrix or two dimensional array of true/false or 1/0 values, with a true/1 value in a position of the pixel map indicating a pixel located at a corresponding position of the image is abnormal, while a false/0 value in a position of the category map indicating a temperature located at a corresponding position of the image is normal. In some aspects, the meaning of these values may be reversed. In some aspects, the category map received in block 705 may be generated by process 500, discussed above with respect to FIG. 5.

In block 710, a region of interest within the image is determined. The region of interest may be determined in some aspects, by reading data from configuration data 240. In some aspects, the region of image may encompass a subset of all the pixels in an image. In some aspects, the region of interest may be defined by a user, for example, by operating a pointing device such as a mouse or touch screen, as well as controls 212a-b shown in FIGS. 2A-C, to identify a portion of the infrared image 205 shown in the user interface 200 of FIGS. 2A-C.

In block 715, a region of abnormal temperatures within the region of interest is identified. In some aspects, block 715 may use connected component analysis to identify a region of contiguous or near contiguous temperatures representing abnormal temperature values.

Decision block 720 determines whether an abnormal region was identified in block 720. If no region was identified, then process 700 continues processing below. If an abnormal region was identified in block 720, then process 700 moves to decision block 725, which evaluates whether an area of the abnormal region identified in block 715 is larger than a percentage of an area of the region of interest.

In block 725, a size of the identified region is compared to a predetermined percent of a region of interest. In some aspects, the percent of the region of interest may be 1%, 2%, 3%, 4%, 5%, 6%, 7%, 8%, 9%, 10%, 15%, 20%, 25%, 30%, 33%, 35%, 50%, 75%, or 100% of the region of interest. If the area of the abnormal region is larger than the percent, process 700 moves to block 730 where an alert is generated.

Some aspects of block 725 may utilize different conditions for generating an alert than those shown in decision block 725 of FIG. 7. For example, in some aspects, an absolute size of the abnormal region may be used to determine if an alert should be generated, either to the exclusion of or in conjunction with the size of the abnormal region relative to a size of the region of interest.

Some aspects may calculate an aggregated "normal" temperature for pixels within the abnormal region and an aggregated temperature within the region of interest. If a distance between the aggregated normal and aggregated measured temperature is above a threshold, an alert may be generated in some aspects. For example, some aspects may include selecting a nominal or normal temperature from the distributions for each of the pixels in the abnormal region. These nominal values may then be aggregated. Similarly, the measured temperatures within the abnormal region may be separately aggregated. This aggregate of measured temperatures represents an aggregated "heat load" for the abnormal region. If the measured heat load is substantially (represented by the threshold) above a normal "heat load" for the abnormal region, an alert may be generated. This technique considers a situation where none of the pixels within the abnormal region may be above a warning or alert threshold, such as the thresholds considered in block 740 of FIG. 7, and thus, no alert is generated based on these thresholds. Additionally, the abnormal region may be a relatively small portion of the region of interest, such that no alert is generated via the embodiment of decision block 725 illustrated in FIG. 7 and discussed above. However, given the number of pixels (within the abnormal region) that are above their nominal or normal points, (i.e. the heat load of the abnormal region), there may be cause for concern such that an alert is proper.

In some aspects, generating an alert in block 730 may include displaying a message on an electronic display, such as a system control console. In some other aspects, generating an alert may include sending an email, text message, or writing data to a log file, or any combination of these. Process 700 then returns to block 715 to identify another region of abnormal pixels (if one exists).

If no abnormal regions are identified in block 720, a maximum temperature within the region of interest is determined in block 735. In decision block 740, if the maximum temperature is above an alert threshold, process 700 moves to block 745, where an alert is generated. The alert threshold referenced in block 740 may be, in some aspects, either a warning or alert threshold, such as the thresholds defined by the warning and alert threshold controls 220a-c and 225a-c illustrated in FIGS. 2A-C above.

Generating an alert in block 745 may include generating a message in an alert window, such as alert window 235d or 235e, shown in FIGS. 2D-E respectively. In some aspects, generating an alert in block 745 may include generating an alert dialog box, such as the dialog box 278 shown in FIG. 2E. After processing of blocks 740 and block 745, to the extent necessary, are complete, processing continues below (details not provided in FIG. 7).

Figure 8:
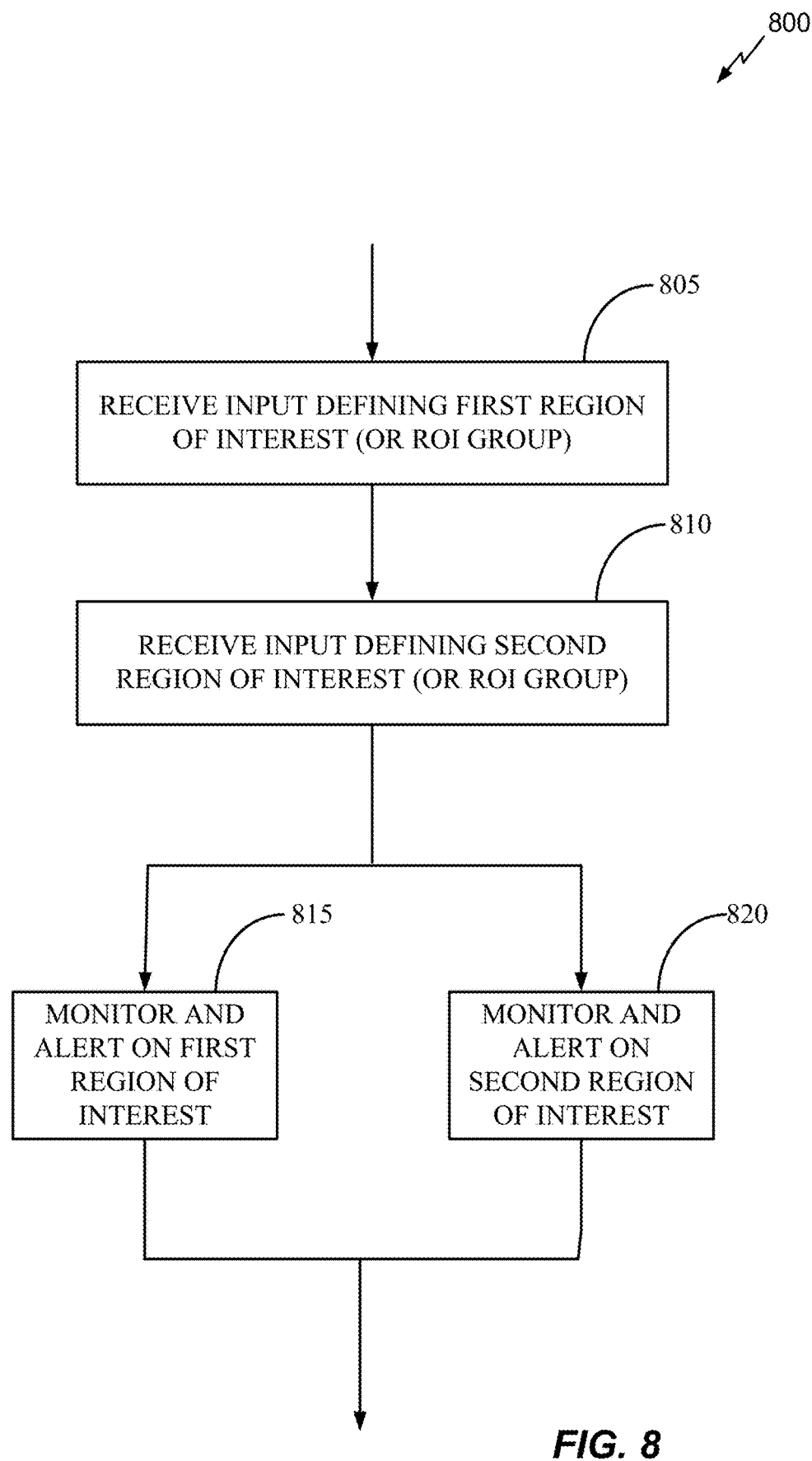
FIG. 8 is a flowchart of a method of monitoring a plurality of regions of interest.

FIG. 8 is a flowchart of a method of monitoring a plurality of regions of interest. In some aspects, the functions discussed below with respect to process 800 may be performed by the processor 310, discussed above with respect to FIG. 3. For example, instructions 330 stored in the memory 315 may configure the processor 310 to perform one or more of the functions discussed below.

In block 805, input is received defining a first region of interest or a region of interest group, such as a group defined by the link to region field 274. In the case of a region of interest group, the region of interest discussed with respect to process 800 may include a plurality of ROIs captured from a plurality of imaging sensors.

In some aspects, the input may be received from the user interface 200 described above with respect to FIGS. 2A-C. For example, in some aspects, one or more of controls 212*a-b* may be selected to define the region of interest. In some aspects, a pointing device, such as a touch screen or a mouse may define boundaries of a region of interest within the image 205. In some aspects, the first region of interest may span pixels captured by multiple imaging sensors, for example, in the stitching embodiments discussed above.

In block 810, second input is received defining a second region of interest or ROI group. The second input may define the second region of interest in a similar manner as that described above for the first region of interest. For example, as shown in each of FIGS. 2A-C, in some aspects, multiple regions of interest may be concurrently defined within the user interface 200. For example the first and second regions of interest of blocks 805 and 810 may correspond to regions of interest 210*a-b* respectively or 210*b-c* respectively or 210*a* and 110*c* respectively in various aspects. In some aspects, each of the first and second regions of interest may have different shapes, sizes, and dimensions than those of the example regions of interest 210*a-c* shown in FIGS. 2A-C. In addition in some aspects the first region of interest or ROI group may include a single ROI while the second region of interest may be a ROI group and include multiple ROIs. Thus, the number of linked ROIs within each of the first and second ROIs referenced with respect to blocks 805 and 810 may vary.

After the two regions of interest are defined, process 800 performs blocks 815 and 820 at least partially in parallel. Both the first and second regions of interest are monitored and alerts generated based on one or more separate warning and alert thresholds, separately associated with the individual regions of interest, as described above with respect to FIGS. 2A-C. In some aspects, each of blocks 815 and 820 may include one or more of the functions discussed above with respect to processes 500, 600, 700. Blocks 815 and 820 may also include one or more of the functions of process 900, discussed below.

Figure 9:
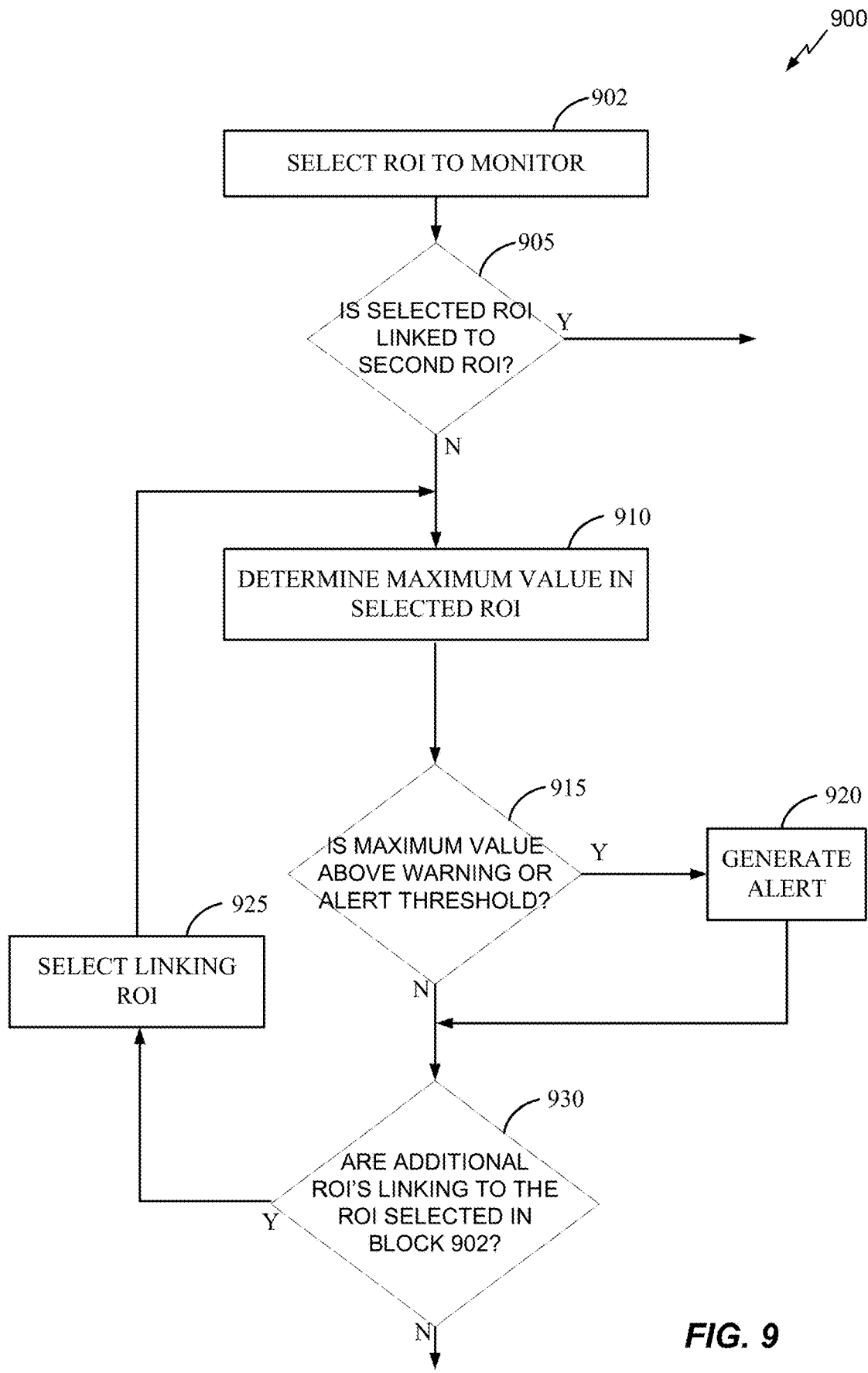
FIG. 9 is a flowchart for monitoring and alerting for a region of interest group.

FIG. 9 is a flowchart for monitoring and alerting of a region of interest group. A region of interest group is a group of regions of interests in images captured from separate imaging sensors. As discussed above, for example, with respect to user interface 200' in FIG. 2C, a user may link multiple regions of interests together to form a "group" of regions of interest. This group of regions of interest may be managed as if they were a single region of interest. For example, regions of interest within the same group may share warning and alerting thresholds.

In block 902, a region of interest is selected for monitoring. In some aspects, the region of interest may be selected from a plurality of regions of interest defined within the system 100 of FIG. 1 and FIG. 3 above. For example, the region of interest may be selected from one of regions of interest 210*a-c*. In some aspects, the region of interest may include image data from a single imaging sensor. In some other aspects, the region of interest may include image data from multiple imaging sensors. As discussed above, some aspects may stitch together image data from multiple imaging sensors. A region of interest may then be defined that spans stitched data from the multiple imaging sensors.

Decision block 905 determines whether the region of interest under evaluation by process 900 is linked to a second region of interest (ROI). If it is, then the warning and alert processing for the region of interest is handled by the linked to" ROI processing. Thus, processing continues to the right (not shown).

If the region of interest under evaluation is not linked to another region of interest, this indicates that either the region of interest is processed as a standalone region of interest, without integration with any other regions of interest, or that this region of interest is a "master" region of interest, in that other regions of interest may link to this region of interest via the "link to region" field 274 on user interface 200'. In either case, monitoring and alerting of this region of interest proceeds to block 910.

In block 910, a maximum temperature value in the selected ROI is determined. In some aspects, block 910 may scan the region of interest for a maximum value. In some aspects, a data structure storing information associated with the region of interest may maintain a current maximum value, and thus, no scanning of the ROI may be performed in some aspects of block 910.

Decision block 915 determines whether the maximum value is above with a warning or alert threshold. The warning and alert thresholds referenced in block 915 may correspond, in some aspects, to the warning and alert thresholds set via controls 220*a* and/or 225*a* of user interface 200 or 200'. If block 915 is processing a "master" ROI, then the warning and alert thresholds are set when the specific "master" ROI is selected in the user interface 200 or 200'. If the ROI being processed by block 915 links to another ROI, and is thus not a master ROI, then the warning and alert thresholds referenced in block 915 may have been configured or set via when the master ROI was selected in the user interface 200 or 200'.

If either of the thresholds are exceeded, process 900 moves to block 920 where an alert is generated. For example, generating an alert, in some aspects, may include generating a warning alert, as shown in alert window 235 of FIG. 2D. Generating an alert may also include generating a maximum temperature alert, for example as shown in alert window 235*e* in FIG. 2E. FIG. 2E also shows that when a maximum temperature alert threshold is exceeded, some aspects, may display an additional warning dialog 278.

Decision block 930 determines whether other regions of interest are linking to the region of interest selected in block 902. If there are additional ROIs (not yet processed through blocks 910/915 for example), then process 900 moves to block 925, which selects an additional ROI linking to the ROI of block 902 (the ROI of block 902 is a master ROI if decision block 910 was reached).

After the additional ROI is selected, processing returns to block 910, to further process this additional ROI, and processing continues as described above.

Via process 900, a plurality of regions of interest, with some of the regions of interest representing portions of images captured by different imaging sensors, the plurality of regions of interests can be processed as a group, with the group sharing at least warning and alerting thresholds.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of a list of" items refers to any combination of those items, including single members. As an example, "at least one of: a, b, or c" is intended to cover: a, b, c, a-b, a-c, b-e, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, the functional means may include a processor and memory operably coupled to the processor, the memory storing instructions that configure to the processor to perform the described functions.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a data communications medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of data communications medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A system for temperature monitoring and detecting abnormally high temperatures of an industrial process, comprising:
  a plurality of infrared imaging sensors, each infrared imaging sensor configured to capture sequences of infrared images of a scene, each infrared image comprising a plurality of pixels, each pixel having a corresponding pixel value;

an imaging analysis computer comprising:
an electronic hardware processor,
an electronic hardware memory operably connected to the electronic hardware processor and storing instructions that configure the electronic hardware processor to:
receive a sequence of a plurality of infrared images of the scene from each infrared imaging sensor of the plurality of infrared imaging sensors for a period of time, wherein each pixel corresponds with a same point of the scene across the sequence of the plurality of infrared images,
determine a temperature value for each pixel corresponding to the pixel value of each pixel for each of the plurality of infrared images in the sequences of infrared images for the period of time,
determine a statistical distribution of temperature values for each pixel over the plurality of infrared images based on the determined temperature value of each pixel of each infrared image of the plurality of infrared images for the period of time, which is defined as a historical time period, such that each pixel includes a separate statistical distribution of temperature values for the historical time period,
define a threshold distance from the statistical distribution of temperature values for each pixel, the threshold distance being greater than the statistical distribution of temperature values,
obtain a subsequent infrared image from at least one infrared imaging sensor of the plurality of infrared imaging sensors,
determine a subsequent temperature value of each pixel in the subsequent infrared image,
compare the determined subsequent temperature value of each pixel with the threshold distance from the statistical distribution of temperature values for each pixel,
when the determined subsequent temperature value for a first pixel is less than the threshold distance from the statistical distribution of temperature values for the first pixel, update the statistical distribution of temperature values for the first pixel with the determined subsequent temperature value to form an updated statistical distribution of temperature values for an updated historical time period,
when the determined subsequent temperature value for the first pixel is greater than the threshold distance from the statistical distribution of temperature values for the first pixel, perform the following steps:
identify a plurality of first pixels in the subsequent image that each have a determined subsequent temperature value that is greater than the threshold distance from the statistical distribution of temperature values for the plurality of first pixels,
determine each pixel of the plurality of first pixels to be abnormal pixels, each abnormal pixel of the plurality of first pixels having the determined temperature value being greater than the threshold distance from its respective statistical distribution of temperature values for the historical time period,
associate adjacent abnormal pixels of the plurality of first pixels to identify an abnormal region,
evaluate a size of the abnormal region, and generate an alert based on a comparison of the size of the abnormal region to at least one of: a size of a region of interest and a predetermined size,
wherein the alert is generated when the size of the abnormal region is larger than: the size of the region of interest or the predetermined size.

2. The system of claim 1, wherein determining temperature values corresponding to the pixel values of the pixels comprises:
determining a temperature value for a pixel based on a depth value for a portion of the scene imaged by the pixel and an emissivity value used to capture the infrared image including the pixel.

3. The system of claim 2, wherein determining a temperature value is further based on a relative humidity.

4. The system of claim 1, wherein the electronic hardware memory further stores instructions that configure the electronic hardware processor to:
determine the region of interest comprising a subset of pixels of the one or more of the plurality of infrared images,
determine an alert threshold associated with the region of interest,
determine a maximum temperature within the region of interest, and
generate an alert of a first type in response to the maximum temperature equaling or exceeding the alert threshold.

5. The system of claim 4, wherein the electronic hardware memory further stores instructions that configure the electronic hardware processor to:
in response to the maximum temperature being less than the alert threshold:
determine a second alert threshold associated with the region of interest, and
generate a second alert of a second type in response to the maximum temperature exceeding the second alert threshold.

6. The system of claim 4, wherein the electronic hardware memory further stores instructions that configure the electronic hardware processor to:
determine a second region of interest comprising a second, different subset of pixels of the one or more of the plurality of infrared images,
determine a second alert threshold associated with the second region of interest,
determine a second maximum temperature within the second region of interest, and generate an alert of the first type in response to the second maximum temperature equaling or exceeding the second alert threshold.

7. The system of claim 6, wherein the first and second regions of interest include only pixels from one of the plurality of infrared imaging image sensors.

8. The system of claim 6, wherein the first and second regions of interest do not overlap.

9. The system of claim 1, wherein the electronic hardware memory further stores instructions that configure the electronic hardware processor to:
generate a master infrared image by stitching together the plurality of infrared images, determine a first region of interest in the master infrared image, the first region of interest including portions of at least two of the plurality of infrared images, wherein the first region of interest in the master infrared image is linked to a second region of interest such that the first region of interest includes a threshold from the second region of interest; and generate the alert based on a threshold associated with the master infrared image.

10. The system of claim 1, wherein the electronic hardware memory further stores instructions that configure the electronic hardware processor to:

determine the region of interest to comprise a subset of pixels of one of the infrared images, wherein the abnormal region is contained within the region of interest; and alerting based on the size of the abnormal region relative to a size of the region of interest.

11. The system of claim 1, wherein the electronic hardware memory further stores instructions that configure the electronic hardware processor to:

determine the region of interest within one of the plurality of infrared images;

determining a second region of interest within a second of the plurality of infrared images, the second region of interest linked to the first region of interest; and alerting based on a threshold associated with the second region of interest.

12. The system of claim 1, wherein the plurality of infrared imaging sensors are at different positions around the scene, wherein the scene includes a petrochemical equipment that operates at an elevated temperature, wherein the system comprises the petrochemical equipment.

13. The system of claim 12, wherein the plurality of infrared imaging sensors provide 360-degree coverage of the scene, wherein the petrochemical equipment includes a petrochemical cracker.

14. The system of claim 12, wherein the plurality of infrared imaging sensors comprises a first set of infrared imaging sensors at a first vertical position relative to the petrochemical cracker in the scene and a second set of infrared imaging sensors at a second vertical position of the petrochemical cracker in to the scene.

15. The system of claim 12, wherein the imaging analysis computer is configured to analyze the infrared images from each of the plurality of infrared imaging sensors to provide temperature information at various locations around the petrochemical equipment in the scene.

16. The system of claim 1, wherein the alert is generated based on an absolute size of the abnormal region.

17. The system of claim 10, wherein the size of the abnormal region is an area of the abnormal region and the size of the region of interest is an area of the region of interest.

18. The system of claim 1, wherein determining abnormal pixels is based on distances of the temperature values of each of the pixels from their corresponding temperature value statistical distributions and from a predetermined threshold value.

19. The system of claim 1, further comprising:

determining whether the temperature value of the respective first pixel is greater than a threshold value, if the temperature value of the respective first pixel is not greater than the threshold value, update the corresponding temperature value distribution for that respective first pixel; or if the temperature value of the respective first pixel is greater than the threshold value, the respective first pixel is an abnormal pixel.

20. A system for temperature monitoring and detecting abnormally high temperatures of an industrial process, comprising:

a plurality of infrared imaging sensors, each infrared imaging sensor configured to capture sequences of infrared images of a scene, each infrared image comprising a plurality of pixels, each pixel having a corresponding pixel value;

an imaging analysis computer comprising:

an electronic hardware processor, an electronic hardware memory operably connected to the electronic hardware processor and storing instructions that configure the electronic hardware processor to:

receive a sequence of a plurality of infrared images of the scene from each infrared imaging sensor of the plurality of infrared imaging sensors for a period of time, wherein each pixel corresponds with a same point of the scene across the sequence of the plurality of infrared images, determine a temperature value for each pixel corresponding to the pixel value of each pixel for each of the plurality of infrared images in the sequences of infrared images for the period of time, determine a statistical distribution of temperature values for each pixel over the plurality of infrared images based on the determined temperature value of each pixel of each infrared image of the plurality of infrared images for the period of time, which is defined as a historical time period, such that each pixel includes a separate statistical distribution of temperature values for the historical time period, define a threshold distance from the statistical distribution of temperature values for each pixel, the threshold distance being greater than the statistical distribution of temperature values, obtain a subsequent infrared image from at least one infrared imaging sensor of the plurality of infrared imaging sensors, determine a subsequent temperature value of each pixel in the subsequent infrared image, generate a master infrared image having the determined subsequent temperatures by stitching together the plurality of infrared images, determine a first region of interest in the master infrared image, the first region of interest including portions of at least two of the plurality of infrared images, wherein the first region of interest in the master infrared image is linked to a second region of interest such that the first region of interest includes a threshold from the second region of interest, compare the determined subsequent temperature value of each pixel in the subsequent infrared image with the threshold distance from the statistical distribution of temperature values for each pixel, when the determined subsequent temperature value for a first pixel is less than the threshold distance from the statistical distribution of temperature values for the first pixel, compare the determined subsequent temperature value of each pixel in the subsequent temperature map with a threshold temperature value, when the determined subsequent temperature value of each pixel in the subsequent temperature map is less than the threshold temperature value, update the statistical distribution of temperature values for the first pixel with the determined subsequent temperature value to form an updated statistical distribution of temperature values for an updated historical time period, when the determined subsequent temperature value for the first pixel is greater than the threshold distance from the statistical distribution of temperature values for the first pixel or is greater than the threshold temperature value, perform the following steps:

identify a plurality of first pixels in the subsequent image that each have a determined subsequent temperature value that is greater than the threshold distance from the statistical distribution of temperature values or greater than the threshold temperature value for the plurality of first pixels, determine each pixel of the plurality of first pixels to be abnormal pixels, each abnormal pixel of the plurality of first pixels having the determined temperature value being greater than the threshold distance from its respective statistical distribution of temperature values for the historical time period or greater than the threshold temperature value, associate adjacent abnormal pixels of the plurality of first pixels to identify an abnormal region, and generate an alert based on a threshold associated with the master infrared image.

* * * * *

UNITED STATES PATENT AND TRADEMARK OFFICE
CERTIFICATE OF CORRECTION

PATENT NO. : 10,740,898 B2  
APPLICATION NO. : 15/197536  
DATED : August 11, 2020  
INVENTOR(S) : Mark C. Israelsen Page 1 of 1

It is certified that error appears in the above-identified patent and that said Letters Patent is hereby corrected as shown below:

In the Specification

In Column 4, Lines 63-64, delete "225a 225c," and insert -- 225a-225c, --, therefor.

In Column 4, Line 64, delete "230a 230c," and insert -- 230a-230c, --, therefor.

In Column 4, Line 65, delete "240a 240c," and insert -- 240a-240c, --, therefor.

In Column 4, Line 66, delete "245a 245c, 246a 246c, and 247a 247c" and insert -- 245a-245c, 246a-246c, and 247a-247c --, therefor.

In Column 7, Line 20, delete "electronic display 320." and insert -- electronic display 325. --, therefor.

In Column 9, Line 42, delete "camera" and insert -- camera. --, therefor.

In Column 13, Line 63, delete "to"" and insert -- to --, therefor.

Signed and Sealed this  
Twenty-ninth Day of September, 2020

Andrei Iancu  
*Director of the United States Patent and Trademark Office*